United States Patent Office 3,838,158
Patented Sept. 24, 1974

3,838,158
DIALKYLAMINO ETHERS OF BENZOPYRANO-
PYRIDINES
Harry George Pars, Lexington, and Raj Kumar Razdan,
Belmont, Mass., assignors to Sharps Associates, Cambridge, Mass.
No Drawing. Filed May 8, 1972, Ser. No. 251,731
Int. Cl. C07d 31/42
U.S. Cl. 260—296 H                                      6 Claims

ABSTRACT OF THE DISCLOSURE

Dialkylamino ethers of benzopyranopyridines represented by the formula

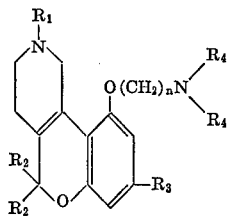

wherein $R_1$ is hydrogen, loweralkyl, loweralkanoyl, cycloalkylloweralkyl, cycloalkylloweralkanoyl, loweralkenyl, loweralkynyl, haloloweralkenyl, phenylloweralkyl, phenylloweralkenyl or phenylloweralkynyl; $R_2$ is loweralkyl; $R_3$ is $C_1$–$C_9$ alkyl or cycloalkylloweralkyl; $n$ is an integer from 1 to 6; and $R_4$ is hydrogen or loweralkyl; and the pharmaceutically acceptable acid addition salts thereof.

DETAILED DESCRIPTION OF THE INVENTION

This invention relates to dialkylamino ethers of benzopyranopyridines, to compositions containing the compounds and to methods for preparing and using the compounds.

The compounds of this invention are represented by the formula

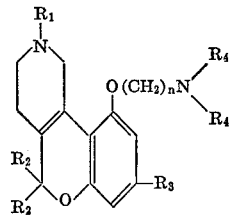

wherein $R_1$ is hydrogen, loweralkyl, loweralkanoyl, cycloalkylloweralkyl, cycloalkylloweralkanoyl, loweralkenyl, loweralkynyl, haloloweralkenyl, phenylloweralkyl, phenylloweralkenyl or phenylloweralkynyl; $R_2$ is loweralkyl; $R_3$ is $C_1$–$C_9$ alkyl or cycloalkylloweralkyl; $n$ is an integer from 1 to 6; and $R_4$ is hydrogen or loweralkyl; and the pharmaceutically acceptable acid addition salts thereof.

The term "loweralkyl" as used herein, refers to $C_1$–$C_6$ straight or branched chain alkyl groups including methyl, ethyl, n-propyl, iso-propyl, n-butyl, sec-butyl, tert-butyl, n-pentyl, iso-pentyl, neo-pentyl, n-hexyl and the like.

The term "loweralkenyl" refers to straight and branched chain $C_2$–$C_6$ alkyl radicals from which a hydrogen atom has been removed from each of two adjacent carbon atoms to produce ethylenic unsaturation; e.g., vinyl, allyl, methallyl, 1-pentenyl and the like.

The term "loweralkynyl" refers to $C_2$–$C_6$ alkyl groups as defined above, from which two hydrogen atoms have been removed from each of two adjacent carbon atoms to produce acetylenic unsaturation; e.g., ethynyl, 2-propynyl, 2-butynyl, 1-pentynyl and the like.

The term "halo" includes chloro, fluoro, bromo and iodo.

The term "loweralkanoyl" refers to saturated, monovalent, aliphatic radicals derived from a monocarboxylic acid, including straight or branched chain radicals of from one to six carbon atoms including formyl, acetyl, propionyl, α-methylpropionyl, butyryl, hexanoyl and the like.

"Cycloalkyl," as used herein, refers to cyclic, saturated aliphatic radicals of from three to eight carbon atoms, such as cyclopropyl, cyclobutyl, cyclohexyl and cyclooctyl.

"Cycloalkylloweralkyl" refers to groups such as cyclopropylmethyl, 2-methylcyclobutyl and the like.

The term "$C_1$–$C_9$ alkyl" refers to straight and branched chain alkyl radicals having from one to nine carbon atoms such as methyl, n-amyl, 3-methyl-2-octyl or 2-nonyl.

The term "acid addition salts" refers to non-toxic salts prepared by reacting a basic ether of a benzopyranopyridine with an organic or inorganic acid, or by reacting the benzopyranopyridine with the salt of an appropriate acid. Representative salts include the hydrochloride, hydrobromide, sulfate, bisulfate, acetate, valerate, oleate, laurate, borate, benzoate, lactate, phosphate, tosylate, citrate, maleate, succinate, tartrate, napsylate and the like. Such salts are well known in the art and are considered to be "pharmaceutically acceptable."

As used herein, the terms "phenylloweralkyl," "phenylloweralkenyl" and "phenylloweralkynyl" means a monovalent radical consisting of a phenyl nucleus bonded to the rest of the molecule, respectively, through a divalent loweralkylene radical of from one of four carbon atoms as illustrated by, but not limited to methylene, 1,1-ethylene, 1,2 - ethylene, 1,3-propylene, 1,2-propylene, 1,4-butylene and the like, or through a divalent loweralkenylene radical of from two to four carbon atoms, as illustrated by, but not limited to 1,2-ethenylene, 1,3-(1-propenylene), 1,3-(1-butenylene), 1,4-(2-butenylene) and the like, or through a divalent loweralkynylene radical of from two to four carbon atoms, as illustrated by, but not limited to 1,2-ethynylene, 1,3-propynylene, 1,3-(1-butynylene) and the like. Here and elsewhere throughout this specification, it will be understood the phenyl ring can bear any number and kind of substituents such as would occur to the man skilled in organic chemistry. Solely for illustration, and without limitation, such substituents include loweralkyl, loweralkoxy, halo (chloro, bromo, iodo or fluoro, nitro, loweralkylmercapto and the like.

The compounds of this invention are useful as sedatives at dosages of 2 to 200 mg./kg. of body weight daily. The sedative activity was first established in the motor activity test wherein mice receive test drug or no drug (control), and placed in chambers equipped with Lehigh Model 1497 photocells. Three mice are placed in each chamber and a total of nine mice per run are used. Changes in motor activity are recorded as counts with the photoelectric cell and compared with control animals.

Presently preferred compounds are those where $R_1$ is alkynyl.

Generally speaking, the ethers of this invention can be prepared by combining equimolar quantities of the corresponding benzopyranopyridine, as the sodium salt, with the appropriate dialkylaminoalkyl halide in a suitable solvent such as benzene, toluene and the like. The reaction mixture is filtered to remove any insoluble material, the solvent is evaporated off and the residue purified, preferably by chromatography.

If desired, the acid addition salt can then be prepared by reacting the ether with an appropriate organic or inorganic acid. The acid addition salt can then be recrystallized from a suitable solvent such as benzene/ether, etc. It will be understood by those skilled in the art that the ethers can react with 2 moles of a monobasic acid or 1 mole of a dibasic acid. Thus, if 2 moles of, for example, HCl is reacted with 1 mole of the ether, the dihydrochloride will be obtained; however, if 1 mole of HCl is reacted with 1 mole of the ether, the hydrochloride will be obtained.

The sodium salt of the benzopyranopyridine can be prepared by reacting the compound with one equivalent of sodium methoxide in methanol and drying the salt *in vacuo* to remove all traces of the alcohol.

The preferred reaction is represented by the following reaction sequence:

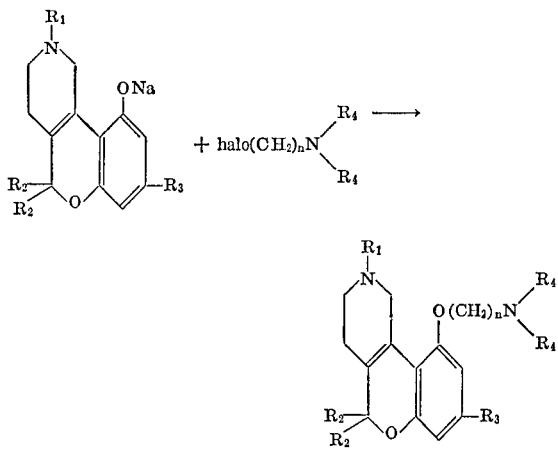

The preparation of the benzopyranopyridines of Formula I is disclosed in U.S. Pat. Nos. 3,576,798 and 3,429,889.

The following examples further illustrate the present invention:

EXAMPLE 1

10-Diethylaminoethoxy - 5,5 - dimethyl - 8 - (3-methyl-2-octyl) - 2 - (2-propynyl) - 1,2,3,4 - tetrahydro-5H-[1]-benzopyrano[3,4-d]pyridine To a solution of 1.16 g. of 5,5-dimethyl-10-hydroxy-8-(3-methyl-2-octyl)-2-(2-propynyl) - 1,2,3,4 - tetrahydro-5H-[1]-benzopyrano[3,4-d]pyridine (2.9 mmole) in 25 ml. of methanol was added one equivalent of sodium methoxide dissolved in 10 ml. of methanol. The solution was heated briefly on a steam bath and the solvent removed on a rotary evaporator. After drying *in vacuo* to remove all traces of alcohol, the sodium derivative was dissolved in 20 ml. of benzene and combined with a solution of 408 mg. (2.9 mmole) of diethylaminoethyl chloride in 10 ml. of benzene. The reaction mixture was refluxed overnight and, after cooling, a small amount of insoluble material was removed by filtration. The solvent was evaporated to give a dark brown residue which was purified by chromatography using 60–100 mesh Florisil® activated magnesium silicate (U.S. 2,393,625) and chloroform. The material was pure by thin layer chromatography (10% MeOH/CHCl$_3$) and the infrared and nmr spectra are consistent with the proposed structure.

*Analysis.*—Calcd. for $C_{32}H_{50}N_2O_2$: C, 77.75; H, 10.13; N, 5.72. Found: C, 77.83; H, 10.24; N, 5.64.

A portion of the above-prepared compound was converted to the dihydrochloride salt by the addition of anhydrous hydrogen chloride to an ether solution of the diethylaminoethoxy derivative. Total material isolated from the reaction was 200 mg. of the diethylaminoethoxy derivative as an orange gum and 200 mg. of the dihydrochloride salt as a beige solid, m.p. 224–225°.

EXAMPLE 2

5,5 - Dimethyl - 10 - [4 - dimethylamino)butoxy]-8-(3-methyl - 2 - octyl) - 2 - (2-propynyl)-1,2,3,4-tetrahydro-5H-[1]-benzopyrano[3,4-d]pyridine is prepared according to the method of Example 1 by reacting equimolar quantities of 5,5-dimethyl-10-hydroxy - 8 - (3-methyl-2-octyl)-2- (2-propynyl)-1,2,3,4-tetrahydro - 5H - [1]-benzopyrano-[3,4-d]pyridine with γ-dimethylaminobutyl chloride and sodium methoxide.

EXAMPLE 3

10 - [3-(Diisobutylamino)propoxy]-5,5-dimethyl-8-(3-methyl - 2 - octyl)-2-(2-propynyl)-1,2,3,4-tetrahydro-5H-[1]-benzopyrano[3,4-d]pyridine is prepared according to the method of Example 1 by reacting equimolar quantities of 5,5 - dimethyl-10-hydroxy-8-(3-methyl-2-octyl)-2-propynyl)-1,2,3,4-tetrahydro-5H-[1]benzopyrano[3,4-d]pyridine with β-diisobutylaminopropyl chloride and sodium methoxide.

EXAMPLE 4

5,5 - Dimethyl-10-di-n-propylaminomethoxy-8-*n*-pentyl-2 - (2 - propynyl)-1,2,3,4-tetrahydro-5H-[1]benzopyrano[3,4-d]pyridine is prepared according to the method of Example 1 by reacting equimolar quantities of 5,5-dimethyl - 10 - hydroxy - 8-*n*-pentyl-2-(2-propynyl)-1,2,3,4-tetrahydro - 5H-[1]benzopyrano[3,4-d]pyridine, di-n-propylaminomethyl chloride and sodium methoxide.

EXAMPLE 5

5,5 - Dimethyl - 10-[5-(di-n-pentylamino)valeroxy]-8-(2 - nonyl)-2-(2-propynyl)-1,2,3,4-tetrahydro-5H-[1]benzopyrano[3,4-d]pyridine is prepared according to the method of Example 1 from equimolar amounts of 5,5-dimethyl-10-hydroxy-8-(2-nonyl)-2-(2-propynyl)-1,2,3,4-tetrahydro - 5H - [1]benzopyrano[3,4-d]pyridine, δ-di-n-pentylaminopentyl chloride and sodium methoxide. One mole of the ether is then reacted with one mole of hydrobromic acid to yield the ether hydrobromide.

EXAMPLE 6

10[4 - (Di-n-hexylamino)butoxy]-2-(2-propynyl)-5,5,8 - trimethyl - 1,2,3,4 - tetrahydro-5H-[1]benzopyrano[3,4-d]pyridine is prepared according to the method of Example 1 from equimolar quantities of 10-hydroxy-2-(2-propynyl-5,5,8-trimethyl - 1,2,3,4 - tetrahydro-5H-[1]benzopyrano[3,4-d]pyridine, γ-di-n-hexylaminobutyl chloride and sodium methoxide.

EXAMPLE 7

2 - Benzyl - 10-[6-(diisopropyl)valeroxy]5,5-dimethyl-8 - (2-hexadecyl)-1,2,3,4-tetrahydro-5H-[1]benzopyrano[3,4-d]pyridine is prepared according to the method of Example 1 from equimolar amounts of 2-benzyl-5,5-dimethyl - 8 - (2-hexadecyl)-10-hydroxy-1,2,3,4-tetrahydro-5H - [1]benzopyrano[3,4-d]pyridine, δ-diisopropylaminopentyl chloride and sodium methoxide.

EXAMPLE 8

By reacting 2 - benzyl - 5,5-dimethyl-10-hydroxy-8-(1-pentyl) - 1,2,3,4 - tetrahydro-5H-[1]benzopyrano[3,4-d]pyridine with equimolar amounts of β-diisobutylaminopropyl chloride and sodium methoxide, according to the method of Example 1, there is obtained 2-benzyl-10-[3-(diisobutylamino)propoxy] - 5,5-dimethyl-8-(1-pentyl)-1,2,3,4-tetrahydro-5H-[1]benzopyrano[3,4-d]pyridine.

EXAMPLE 9

By reacting 2 - cyclobutylmethyl - 5,5-dimethyl-8-(2-eicosyl) - 10 - hydroxy-1,2,3,4-tetrahydro-5H-[1]benzopyrano[3,4-d]pyridine with equimolar amounts of γ-diethylaminobutyl chloride and sodium methoxide according to the method of Example 1, there is obtained 2-cyclobutylmethyl - 10 - [4 - (diethylamino)butoxy]-8-(2-eicosyl) - 1,2,3,4 - tetrahydro - 5H - [1]benzopyrano-[3,4-d]pyridine. One mole of the ether is then reacted with 1 mole of hydrochloric acid to yield the ether hydrochloride.

EXAMPLE 10

By reacting 5,5 - dimethyl-10-hydroxy-2-phenethyl-8-(2 - tetradecyl) - 1,2,3,4-tetrahydro-5H-[1]benzopyrano-[3,4-d]pyridine with equimolar amounts of γ-diethylaminobutyl chloride and sodium methoxide, according to the method of Example 1, there is obtained 10-[4-(diethylamino)butoxy]-5,5-dimethyl-2-phenethyl-8-(2-tetradecyl) - 1,2,3,4 - tetrahydro - 5H-[1]benzopyrano[3,4-d]pyridine.

EXAMPLE 11

By reacting 2 - allyl-5,5-diethyl-10-hydroxy-8-(3-methyl - 2-octyl)-1,2,3,4-tetrahydro-5H-[1]benzopyrano[3,4-d]pyridine with equimolar amounts of γ-diethylaminobutyl chloride and sodium methoxide, according to the method of Example 1, there is obtained 2-allyl-5,5-diethyl-10[4-(diethylamino)butoxy] - 1,2,3,4 - tetrahydro-5H-[1]benzopyrano[3,4]pyridine.

EXAMPLE 12

By reacting 2 - acetyl-8-(3-cyclopropyl-2-propyl)-5,5-dimethyl - 10 - hydroxy-1,2,3,4-tetrahydro-5H-[1]benzopyrano[3,4 - d]pyridine with equimolar amounts of dipropylaminoethyl chloride and sodium methoxide, according to the method of Example 1, there is obtained 2-acetyl - 8 -(3 - cyclopropyl-2-propyl)-5,5-dimethyl-10-dipropylaminoethoxy - 1,2,3,4 - tetrahydro - 5H - [1]benzopyrano[3,4-d]pyridine.

EXAMPLE 13

By reacting 8 - cyclohexylethyl-2-cyclopropylcarbonyl-5,5 - dimethyl - 10 - hydroxy-1,2,3,4-tetrahydro-5H-[1]benzopyrano[3,4-d]pyridine with equimolar amounts of dimethylaminoethyl chloride and sodium methoxide, according to the method of Example 1, there is obtained 8-cyclohexylethyl -2 - cyclopropylcarbonyl-5,5-dimethyl-10-dimethylaminoethoxy - 1,2,3,4 - tetrahydro-5H-[1]benzopyrano[3,4-d]pyridine. The dimaleate salt is obtained by reacting 1 mole of the ether with 2 moles of maleic acid.

EXAMPLE 14

By reacting 2 - [1 - (cis - 3-chloro-2-propenyl]-5,5-dimethyl - 10 - hydroxy-8-(3-methyl-2-octyl)-1,2,3,4-tetrahydro-5H - [1]benzopyrano[3,4-d]pyridine with γ-diethylaminobutyl chloride and sodium methoxide, according to the method of Example 1, there is obtained 2-[1-(cis-3-chloro-2-propenyl)]-10-[4-(diethylamino)butoxy]-5,5-dimethyl - 8 - (3-methyl-2-octyl)-1,2,3,4-tetrahydro-5H-[1]benzopyrano[3,4-d]pyridine.

EXAMPLE 15

By reacting 5,5 - dimethyl-8-(2-heptyl)-10-hydroxy-2-[2 - (4-methylphenethyl)]-1,2,3,4-tetrahydro-5H-[1]benzopyrano[3,4-d]pyridine with equimolar amounts of β-diethylaminopropyl chloride and sodium methoxide, according to the method of Example 1, there is obtained 10-[3-(diethylamino)-propoxy-5,5-dimethyl-8-(2-heptyl)-2 - [2 - (4-methylphenethyl)]-1,2,3,4-tetrahydro-5H-[1]benzopyrano[3,4-d]pyridine.

EXAMPLE 16

By reacting 5,5-dimethyl-10-hydroxy-2-(3-methyl-2-butenyl) - 8 - (3 - methyl - 2 - octyl) - 1,2,3,4 - tetrahydro-5H[1]benzopyrano[3,4 - d]pyridine with equimolar amounts of γ-diethylaminobutyl chloride and sodium methoxide, according to the method of Example 1, there is obtained 10-[4-(diethylamino)butoxy]-5,5-dimethyl-2-(3 - methyl - 2 - butenyl) - 8 - (3 - methyl - 2 - octyl)-1,2,3,4-tetrahydro-5H-[1]benzopyrano[3,4-d]pyridine.

EXAMPLE 17

By reacting 5,5-dimethyl-10-hydroxy-8-(3-methyl-2-octyl) - 2 - {4 - [1 - (3 - sulfamylphenyl) - 1 - butenyl}-1,2,3,4-tetrahydro-5H - [1]benzopyrano[3,4 - d]pyridine with equimolar amounts of β-diisopropylaminopropyl chloride and sodium methoxide, in accordance with the method of Example 1, there is obtained 5,5-dimethyl-10-[3 - (diisopropylamino) - propoxy] - 2 - {4 - [1 - (3 - sulfamylphenyl) - 1 - butenyl]} - 1,2,3,4 tetrahydro - 5H-[1]benzopyrano[3,4-d]pyridine.

EXAMPLE 18

By reacting 5,5-dimethyl-10-hydroxy-8-(3-methyl-2-octyl) - 2 - {3 - [1 - (4 - acetylaminophenyl) - 1 - butenyl]}-1,2,3,4 - tetrahydro - 5H - [1]benzopyrano[3,4 - d]pyridine with equimolar amounts of diethylaminomethyl chloride and sodium methoxide, according to the method of Example 1, there is obtained 10-diethylaminomethoxy-5,5-dimethyl - 8 - (3 - methyl - 2 - octyl) - 2 - {3 - [1 - (4 - acetylaminophenyl) - 1 - butenyl]} - 1,2,3,4 - tetrahydro - 5H-[1]benzopyrano[3,4-d]pyridine.

EXAMPLE 19

By reacting 10 - hydroxy-8-(3-methyl-2-octyl)-5,5-di-n-propyl - 2 - {4 - [1 - (3 - trifluoromethylphenyl) - 1 - butenyl]} - 1,2,3,4 - tetrahydro - 5H - [1]benzopyrano[3,4-d]pyridine with equimolar amounts of γ-diethylaminobutyl chloride and sodium methoxide according to the method of Example 1, there is obtained 10-[4-(diethylamino)butoxy - 8 - (3 - methyl - 2 - octyl) - 5,5 - di - n-propyl - 2 - {4 - [1 - (3 - trifluoromethylphenyl) - 1 - butenyl]} - 1,2,3,4 - tetrahydro - 5H-[1]benzopyrano[3,4-d]pyridine.

EXAMPLE 20

By reacting 8-cyclopropyl-5,5-dimethyl-10-hydroxy-2-propionyl-1,2,3,4-tetrahydro - 5H-[1]benzopyrano[3,4-d]pyridine with equimolar amounts of diethylaminoethyl chloride and sodium methoxide, according to the method of Example 1, there is obtained 8-cyclopropyl-10-diethylaminoethoxy-5,5-dimethyl - 2 - propionyl - 1,2,3,4-tetrahydro-5H-[1]benzopyrano[3,4-d]pyridine.

EXAMPLE 21

By reacting 2-cinnamyl - 8 - cyclopropylmethyl-5,5-dimethyl-10-hydroxy - 1,2,3,4 - tetrahydro - 5H - [1]benzopyrano[3,4-d]pyridine with equimolar amounts of γ-diethylaminobutyl chloride and sodium methoxide, according to the method of Example 1, there is obtained 2-cinnamyl-8-cyclopropylmethyl - 10 - [4 - (diethylamino)butoxy]-5,5-dimethyl - 1,2,3,4 - tetrahydro-5H-[1]benzopyrano[3,4-d]pyridine.

EXAMPLE 22

By reacting 5,5-dimethyl - 10 - hydroxy-8-(3-methyl-2-octyl)-2-[2-(4 - methylmercaptophenethyl)]-1,2,3,4-tetrahydro-5H-[1]benzopyrano[3,4-d]pyridine with γ-diethylaminobutyl chloride and sodium methoxide, according to the method of Example 1, there is obtained 10-[4-(diethylamino)butoxy]-5,5-dimethyl-8-(3 - methyl-2-octyl)-2-[2-(4-methylmercaptophenethyl)] - 1,2,3,4 - tetrahydro-5H-[1]benzopyrano[3,4-d]pyridine.

EXAMPLE 23

By reacting 5,5-dimethyl - 10 - hydroxy-8-(3-methyl-2-octyl)-2-[4-(4-nitrophenylbutyl)] - 1,2,3,4-tetrahydro-5H-[1]benzopyrano[3,4-d]pyridine with equimolar amounts of γ-diethylaminobutyl chloride and sodium methoxide, according to the method of Example 1, there is obtained 10-[4 - (diethylamino)butoxy]-5,5-dimethyl-8-(3-methyl-2-octyl)-2-[4-(4-nitrophenylbutyl)] - 1,2,3,4 - tetrahydro-5H-[1]benzopyrano[3,4-d]pyridine.

EXAMPLE 24

By reacting 5,5-di(1-hexyl) - 10 - hydroxy-8-methyl-2-[3-(1-propynyl)] - 1,2,3,4 - tetrahydro-5H-[1]benzopyrano[3,4-d]pyridine with equimolar amounts of γ-diethylaminoethyl chloride and sodium methoxide, according to the method of Example 1, there is obtained 10-diethylaminoethoxy - 5,5 - di-(1-hexyl)-8-methyl-2-[3-(1-propynyl)] - 1,2,3,4 - tetrahydro - 5H-[1]benzopyrano[3,4-d]pyridine.

The present invention includes within its scope pharmaceutical compositions comprising, as an active ingredient, at least one of the compounds of this invention in association with a pharmaceutical carrier or diluent. The compounds of this invention exhibit both oral and parenteral activity and can be formulated in dosage forms for oral, parenteral or rectal administration.

Solid dosage forms for oral administration include capsules, tablets, pills, powders and granules. In such solid dosage forms, the active compound is admixed with at least one inert diluent such as sucrose, lactose or starch. Such dosage forms can also comprise, as is normal practice, additional substances other than inert diluents, e.g., lubricating agents such as magnesium stearate. In the case of capsules, tablets and pills, the dosage forms may also comprise buffering agents. Tablets and pills can additionally be prepared with enteric coatings.

Liquid dosage forms for oral administration include pharmaceutically acceptable emulsions, solutions, suspensions, syrups and elixirs containing inert diluents commonly used in the art, such as water. Besides inert diluents, such compositions can also include adjuvants, such as wetting agents, emulsifying and suspending agents and sweetening, flavoring and perfuming agents.

Preparations according to this invention for parenteral administration include sterile aqueous or non-aqueous solutions, suspensions or emulsions. Examples of non-aqueous solvents or vehicles are propylene glycol, polyethylene glycol, vegetable oils, such as olive oil and injectable organic esters such as ethyl oleate. Such dosage forms may also contain adjuvants such as preserving, wetting, emulsifying and dispersing agents. They may be sterilized by, for example, filtration through a bacteria-retaining filter, by incorporating sterilizing agents into the compositions, by irradiating the compositions, or by heating the compositions. They can also be manufactured in the form of sterile solid compositions which can be dissolved in sterile water or some other sterile injectable medium immediately before use.

Compositions for rectal administration are suppositories which may contain in addition to the active substance, excipients such as cocoa butter or a suppository wax.

The dosage of active ingredient in the compositions of this invention may be varied; however, it is necessary that the amount of the active ingredient shall be such that a suitable dosage form is obtained. The selected dosage depends upon the desired therapeutic effect, on the route of administration and on the duration of the treatment. Generally, dosage levels of between 2 to 200 mg./kg. of body weight daily are administered to patients.

The following example further illustrates the pharmaceutical compositions which are a feature of this invention:

EXAMPLE 25

Tablets weighing 500 mg. and having the following compositions are prepared by standard tableting procedures:

Ingredient: Mg.
10 - Diethylaminoethoxy - 5,5 - dimethyl - 8-
 (3 - methyl - 2 - octyl) - 2 - (2 - propynyl)-
 1,2,3,4 - tetrahydro - 5H - [1]benzopyrano
 [3,4-d]pyridine dihydrochloride _____ 250
Starch _____ 190
Colloidal silica _____ 50
Magnesium stearate _____ 10

We claim:
1. A compound of the formula

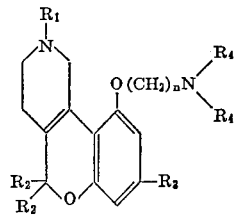

wherein $R_1$ is hydrogen, a lower alkyl having 1 to 6 carbons, a cycloalkyl-lower alkyl in which the cycloalkyl group contains 3 to 8 carbons and the lower alkyl group contains 1 to 6 carbons, a lower alkenyl containing 2 to 6 carbons, a lower alkynyl containing 2 to 6 carbons, a halo-lower alkenyl in which the halo is chloro, fluoro, bromo or iodo and the lower alkenyl group contains 2 to 6 carbons, or a phenyl-lower alkyl in which the lower alkyl group contains 1 to 6 carbons; $R_2$ is a lower alkyl containing 1 to 6 carbons; $R_3$ is an alkyl group containing 1 to 9 carbons or it is a cycloalkyl-lower alkyl in which the cycloalkyl group contains 3 to 8 carbons and the lower alkyl group contains 1 to 6 carbons; $n$ is an integer from 1 to 6; $R_4$ is hydrogen or a lower alkyl having 1 to 6 carbons; or a pharmaceutically acceptable acid addition salt thereof.

2. A compound in accordance with claim 1 wherein $R_1$ is lower alkenyl, lower alkynyl or halo-lower alkenyl as each group is defined in claim 1, and $R_2$, $R_3$ and $R_4$ are as defined in claim 1.

3. A compound in accordance with claim 2 wherein $R_1$ is lower alkynyl.

4. A compound in accordance with claim 3 wherein $R_1$ is propargyl.

5. 10 - Diethylaminoethoxy-5,5-dimethyl-8-(3-methyl-2-octyl) - 2 - (2-propynyl)-1,2,3,4-tetrahydro-5H-[1]benzopyrano[3,4-d]pyridine or a pharmaceutically acceptable acid addition salt thereof.

6. 10 - Diethylaminoethoxy-5,5-dimethyl-8-(3-methyl-2-octyl)-2-(2-propynyl) - 1,2,3,4 - tetrahydro-5H-[1]benzopyrano[3,4-d]pyridine dihydrochloride.

References Cited
UNITED STATES PATENTS
3,635,993  1/1972  Pars et al. _____ 260—297 H OTHER REFERENCES
Karrer: Organic Chemistry, 4th English Edition, p. 928, Elsevier Pub. Co. (N.Y.) 1950.
Chemical & Engineering News, p. 18, April 1972.

ALAN L. ROTMAN, Primary Examiner

U.S. Cl. X.R.
260—294.8 R, 295 S; 424—263, 266

PO-1050
(5/69)

UNITED STATES PATENT OFFICE
CERTIFICATE OF CORRECTION

Patent No. 3,838,158      Dated September 24, 1974

Inventor(s) Harry George Pars et al.

It is certified that error appears in the above-identified patent and that said Letters Patent are hereby corrected as shown below:

Column 2, line 30, change "of four" to --to four--,
line 46, change "fluoro," to --fluoro),--; column 4,
line 11, change "propynyl)" to --(2-propynyl)--;
column 5, line 68, change "butenyl}-" to --butenyl]}- --.

Signed and sealed this 19th day of November 1974.

(SEAL)
Attest:

McCOY M. GIBSON JR.          C. MARSHALL DANN
Attesting Officer            Commissioner of Patents